March 15, 1932. L. RADO 1,849,591
DEVICE FOR CUTTING CONTINUOUS SHEETS OF A VERY THIN MATERIAL
Filed Oct. 22, 1929
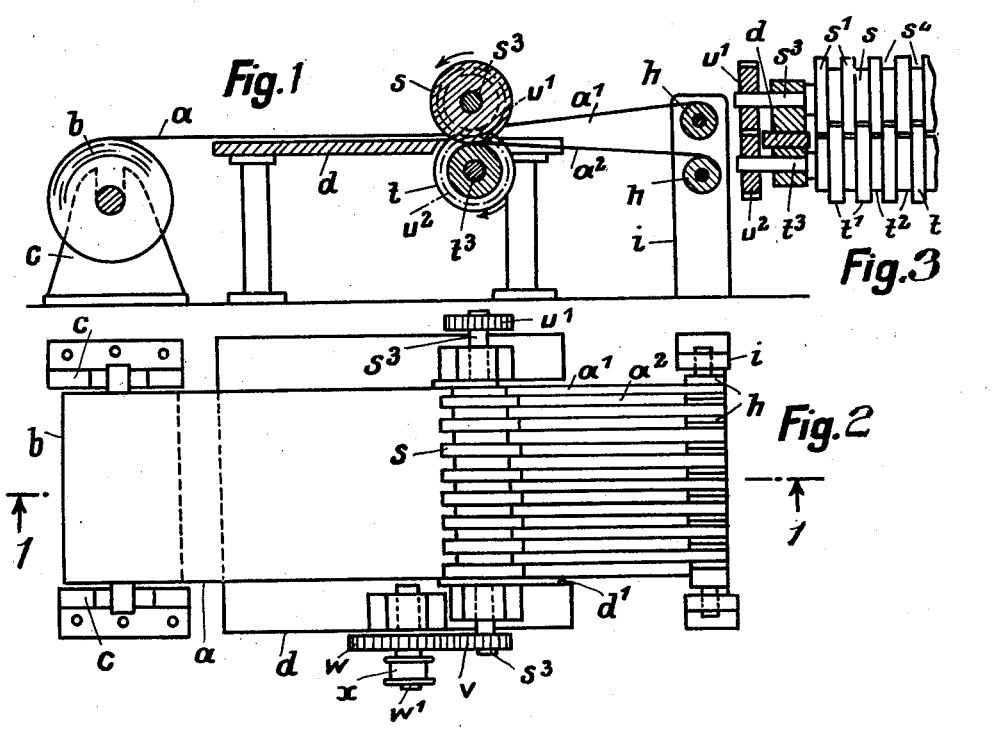

Patented Mar. 15, 1932

1,849,591

UNITED STATES PATENT OFFICE

LEOPOLD RADO, OF BERLIN-WANNSEE, GERMANY

DEVICE FOR CUTTING CONTINUOUS SHEETS OF A VERY THIN MATERIAL

Application filed October 22, 1929, Serial No. 401,453, and in Germany October 9, 1928.

My invention relates to the production of strips or threads out of a continuous sheet of a very thin material such as metal foils, paper, and so on, and has for its object to provide certain improvements which allow of cutting such continuous sheets of any width into a corresponding number of strips or threads in such a manner that the thus produced strips or threads are not separated or torn to pieces while being cut and spooled. Hitherto, cutting up of such thin sheets of metal or the like into strips or threads has been secured by means of a corresponding number of cutting tools placed in lateral juxtaposition. The distance between the cutting tools had to correspond to the desired width of the strips into which the sheet had to be divided up, and this method could only be applied in cutting strips of a certain width and a corresponding thickness. Any attempt to reduce this certain width resulted in a destruction of the strips during the action of the knives. This result is due to the fact that the cutting tool is necessarily of a certain thickness, and the material cut had to be displaced on both sides of the cutting edge for a corresponding amount. The cutting tools being all placed laterally in a line as hitherto practised the strip during cutting could not be displaced between two adjacent cutting edges, and in consequence thereof would bulge out in either direction. On reducing the width of the strips to be cut the latter would produce a considerable friction between and in contact with the cutting tools. It was due to this frictional resistance that the strips or threads cut by the knives were frequently torn to pieces by the spooling mechanism.
My invention consists broadly in the provision of two complementary coacting rolls formed with cutting edges which are alternately stepped in a vertical direction so that the severed strips may be drawn off along divergent horizontal lines and particularly in the provision of pairs of circular shears having converging members of the same width as the strips to be produced. A preferable embodiment of a plurality of such shears comprise pairs of oppositely revolving rollers having co-operating shearing projections and indentations of the desired strip width.

My invention may be successfully applied for the production of very fine strips or threads of metal foils, cellulose films, and the like. These very narrow strips may be used for producing ornamental effects.

Embodiments of my invention are illustrated, by way of example, in the drawings forming a part of this application.

In the drawings:

Figure 1 is a sectional view along the line 3—3;

Figure 2 is a plan view of the structure shown in Figure 1;

Figure 3 is an elevation of the shearing tool shown in Figures 1 and 2, the bearings and intermeshing gears thereof being in section.

In the drawings the continuous sheet of material $a$ is drawn from a feeding roll $b$ carried on standards $c$ and passed over a table $d$ between a pair of cutting rollers which produce two vertically divergent series of strips $a^1$ and $a^2$ which are wound upon two superposed series of spools $h$ revolubly carried in a frame $i$. The spools $h$ are to be actuated to revolve at a speed corresponding to the circumferential speed of the cutting knives. The latter consist of a pair of superposed rollers $s$ and $t$ revolving in opposite direction (see the arrows in Figure 1). The cutting rollers are composed of a plurality of juxtaposed circular shears carried on shafts $s^3$ and $t^3$ which revolve in bearings of the table $d$ and are driven by means of intermeshing toothed wheels $u^1$ and $u^2$. The shafts $s^3$ and $t^3$ are actuated by means of a pair of toothed wheels $v$ and $w$. The toothed wheel $w$ is carried on a shaft $w^1$ and revolved by means of a belt wheel $x$ connected to suitable power source not shown. Each circular shear member consists of a disk having a cutting edge at the junction of each side face with the peripheral face. The width of each disk corresponds to the strip width to be cut. The opposing and adjoining shear disks are of different diameter, as shown in Figure 3.

By this arrangement alternate strips $a^1$, $a^2$ are moved to different levels simultaneously with the cutting action of the disks (Fig. 3).

The disks $s$, $s^1$, $s^2$.... mounted on the shaft $s^3$ form an integral roller which meshes with another roller mounted on shaft $t^3$ (Fig. 5) and having projections $t$, $t^1$, and indentations $t^2$ corresponding to the indentations $s$, $s^2$, and projections $s^1$ of the first roller and cooperating therewith to form circular shears.

This device is particularly designed for cutting thin aluminum foil of less than one hundredth millimeter thickness. Hitherto it has been impossible to continuously cut such an extremely thin foil into strips by devices using coacting rollers for cutting disks thereon because the friction caused between the cutters and the metal foil frequently causes a breakage of the strips cut because this friction exceeded the pulling force exerted by the power actuated winding spools and placed a tension on the extremely thin foil. When the cut is made by shearing disks entering into the foil, the strips cut are displaced laterally for the amount of the width of the incision, there being no free space into which the displaced metal foil can enter, and increased friction against the lateral faces of the cutters is due to this displacement. This friction will act in opposition to the pull exerted on the foil by the winding spools and this causes a breakage of the strips immediately after the action of the cutting disks has taken place.

I have discovered that this breakage can be positively prevented if the strips, immediately after the cutting action of the cutting disks has taken place, are deflected off the point where the incision took place. This deflection, in my apparatus illustrated, is obtained in consequence of two structural features, namely, first, that the circular shears $s$ and $t$ intersect each other to a considerable degree, and that the winding spools are superposed on different levels. By reason of the fact that the disk-like shears intersect each other to a considerable degree, that is, overlap a considerable distance, each strip after being severed from the sheet by the co-operation of the two circular shears, is carried on the circumference of the shear immediately opposite the strip and it is thus immediately deflected from the plane or level on which the incision is made and is deflected in opposite directions on to the winding spools.

I claim:

1. A device for cutting continuous sheets of very thin material comprising, in combination, a table adapted to support a continuously moving sheet of thin material, a pair of superposed rollers disposed in the length of said table, one of the rollers being disposed below the table and the other above, each roller having a plurality of alternate cutting disks and spacers, the spacers having less diameter than the cutting disks, the spacers and disks having approximately the same thickness the cutting disks of one roller being disposed in staggered relation to the cutting disks of the other roller and engaging against the peripheral faces of the spacers of the last named roller, means for causing said rollers to revolve in opposite directions, and two sets of vertically superposed winding spools, alternate strips being carried to different winding spools.

2. A device for cutting continuous sheets of very thin material including a pair of superposed rollers, each roller having a plurality of alternate cutting disks and spacers, the spacers having less diameter than the cutting disks, the spacers and disks having approximately the same thickness, the cutting disks of one roller being disposed in staggered relation to the cutting disks of the other roller, the cutting disks of one roller projecting deeply into the spaces between the cutting disks of the other roller whereby adjacent strips of material being cut are deflected in opposite directions off the plane at which the cut was made, means for causing said rollers to rotate in opposite directions and two sets of vertically disposed winding spools, alternate cut strips being carried to one set or the other of said winding spools.

In testimony whereof I have affix my signature.

LEOPOLD RADO.